United States Patent
Bargmann et al.

(10) Patent No.: US 10,766,452 B2
(45) Date of Patent: Sep. 8, 2020

(54) SELF-LOCKING BELT RETRACTOR

(71) Applicant: Autoliv Development AB, Vårgårda (SE)

(72) Inventors: Arne Bargmann, Hamburg (DE); Doris Kröger, Tornesch (DE); Anriruddha Deshpande, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 7 days.

(21) Appl. No.: 15/999,338

(22) PCT Filed: Feb. 16, 2017

(86) PCT No.: PCT/EP2017/053486
§ 371 (c)(1),
(2) Date: Aug. 17, 2018

(87) PCT Pub. No.: WO2017/140769
PCT Pub. Date: Aug. 24, 2017

(65) Prior Publication Data
US 2019/0039563 A1    Feb. 7, 2019

(30) Foreign Application Priority Data
Feb. 17, 2016   (DE) .................. 10 2016 202 383

(51) Int. Cl.
*B60R 22/40* (2006.01)
*B60R 22/405* (2006.01)

(52) U.S. Cl.
CPC ............ *B60R 22/405* (2013.01); *B60R 22/40* (2013.01)

(58) Field of Classification Search
CPC .............................. B60R 22/40; B60R 22/405
See application file for complete search history.

(56) References Cited

U.S. PATENT DOCUMENTS 8,672,252 B2 * 3/2014 Kroger ................. B60R 22/405
                                                    242/383.1
2009/0126489 A1   5/2009 Yamada et al.
(Continued)

FOREIGN PATENT DOCUMENTS

DE          19539619 C2    8/2001
DE      102009018177 A1    8/2009
(Continued)

OTHER PUBLICATIONS

International Search Report for PCT/EP2017/053486, ISA/EP, Rijswijk, NL, dated May 10, 2017, with English translation.
(Continued)

*Primary Examiner* — Sang K Kim
(74) *Attorney, Agent, or Firm* — Stephen T. Olson; Harness, Dickey & Pierce, P.L.C.

(57) ABSTRACT

A self-locking seat belt retractor includes a blocking system for a seat belt winding shaft that is actuated in an at least vehicle-sensitive manner, in which, in the event of triggering, a sensor mass mounted in a vehicle-sensitive manner moves a locking lever with its engagement tip into a trigger position in engagement with the toothing of a control disk, as the result of which the control disk in its joint rotational motion with the belt winding shaft is stopped and the blocking system is activated. The sensor mass is situated in a support part on a contact surface, and when vehicle accelerations occur the sensor mass in the support part is movable on the contact surface by inertial control from a neutral position into the trigger position. The support part together with the sensor mass situated therein is situated in a housing that includes the control disk. The housing with the support part and the sensor mass situated therein is fixable on the seat belt retractor in various rotational angle positions with respect to the control disk.

14 Claims, 6 Drawing Sheets

(56) References Cited

U.S. PATENT DOCUMENTS

2015/0115090 A1* 4/2015 Siebeck .................. B60R 22/40
                                                            242/396.4
2016/0288768 A1* 10/2016 Hodatsu ................. B60R 22/40

FOREIGN PATENT DOCUMENTS

| EP | 2282916 A1 | 2/2012 |
|----|---|---|
| JP | 2003072515 A | 3/2003 |
| JP | 2003154921 A | 5/2003 |
| WO | WO-2009/46991 A1 | 4/2009 |
| WO | WO-2009/143984 A1 | 12/2009 |
| WO | WO-2015/169839 A1 | 11/2015 |
| WO | WO-2015/185486 A1 | 12/2015 |
| WO | WO-2018/158361 A1 | 9/2018 |

OTHER PUBLICATIONS

Written Opinion of the ISA for PCT/EP2017/053486, ISA/EP, Rijswijk, NL, dated May 10, 2017.

* cited by examiner

SELF-LOCKING BELT RETRACTOR

CROSS-REFERENCE TO RELATED APPLICATIONS

This application is a 371 U.S. National Stage of International Application No. PCT/EP2017/053486, filed on Feb. 16, 2017, which claims priority to German Patent Application No. DE 10 2016 202 383.7, filed on Feb. 17, 2016. The entire disclosures of the above applications are incorporated herein by reference.

FIELD

The invention relates to a self-locking seat belt retractor having a blocking system for a belt winding shaft that is actuated in an at least vehicle-sensitive manner, in which, in the event of triggering, a sensor mass mounted in a vehicle-sensitive manner moves a locking lever with its engagement tip into a trigger position in engagement with the toothing of a control disk, as the result of which the control disk in its joint rotational motion with the belt winding shaft is stopped and the blocking system is activated, wherein the sensor mass is situated on a contact surface of a support part, and when vehicle accelerations occur the sensor mass is movable on the contact surface of the support part by inertial control from a neutral position into the trigger position, wherein the support part together with the sensor mass situated therein is situated in a housing that includes the control disk.

DISCUSSION

A seat belt retractor having the features stated above is described in DE 195 39 619 C2. The locking lever is connected in a form-fit manner to a sensor mass at the end opposite from the engagement tip, thus forming a bearing, and the sensor mass in turn is pivotably supported on a bearing surface.

A general problem with such seat belt retractors is that in order to be functional, the sensor mass must be situated in a certain orientation in space and with respect to the bearing surface so that the sensor mass is reliably moved from the neutral position into the trigger position only when the predefined limit value of the vehicle deceleration is exceeded.

The orientations of the sensor mass and of the bearing surface also depend on the installation position of the seat belt retractor in the vehicle, which is specified by the body structure and the provided fastening site on the vehicle. Therefore, the sensor together with the bearing surface for the particular installation position of the seat belt retractor in the vehicle must be individually aligned with respect to the seat belt retractor so that the sensor mass and the bearing surface have the orientation in space and with respect to the vehicle that is important for their functioning. For this purpose, it is known from WO 2009/143984 A1 to provide ring toothing on the inner side of a sensor cap that covers the sensor on the outside, and the sensor may be held in the ring toothing in various angular orientations with respect to the control disk. As a result of the ring toothing on the sensor cap, a fastening attachment is created, on which the sensor together with the sensor mass and the bearing surface may be situated in various orientations and arrangements with respect to the control disk without having to change the structure of the seat belt retractor. For this purpose, complementary toothing is likewise provided on the sensor, via which the sensor may be pressed into the toothing of the sensor cap in a predetermined angular orientation. The sensor is thus subsequently fixed in the circumferential direction due to the form-fit engagement of the toothings. The sensor cap together with the sensor situated therein is then fastened to the frame of the seat belt retractor, so that the sensor is subsequently captively clamped between the sensor cap and the frame of the seat belt retractor.

The object of the invention is to provide an improved self-locking seat belt retractor in which the orientation of the sensor with respect to the control disk may be adjusted using simplified means and with high accuracy during the installation operation.

SUMMARY

The basic concept of the invention is seen in that the housing together with the support part and the sensor mass situated therein is fixable to the seat belt retractor in various rotational angular positions with respect to the control disk. The advantage of the proposed refinement is seen in that the sensor is mounted in the housing in a preassembly step in which the orientation of the sensor is not yet provided, so that installation may be performed in a simplified manner. This is advantageous in particular due to the fact that the sensor is a highly filigreed component. Due to the importance of the sensor and its filigreed design, the sensor must be handled very carefully during installation so that it is not damaged in any way during installation, and subsequently reliably fulfills its function important for the restraint. Due to the preassembly of the sensor in the housing, it may be installed in a simplified manner with a lower likelihood of damage. The orientation of the sensor is then provided by installing the housing together with the sensor, already affixed therein, in a predetermined orientation with respect to the control disk. During the installation of the housing on the seat belt retractor and the adjustment of the rotational angle orientation, the filigreed sensor is neither touched nor subjected to stress, so that this installation as well is significantly simplified. During this installation step the housing essentially acts as protection for the sensor from external mechanical influences.

It is further proposed that the housing has first toothing, and a fastening ring fastened to the seat belt retractor is provided with second toothing, and the housing, via the engagement of the first toothing with the second toothing of the fastening ring, is fastenable to the seat belt retractor in the particular rotational angular position with respect to the control disk. The toothings, via the tooth intervals, specify the rotational angle increments in which the housing and thus the sensor may be fastened to the seat belt retractor in the various rotational angular positions. The fastening ring is always fastened to the seat belt retractor in the same orientation, and is used only to fix the housing to the seat belt retractor in the predetermined orientation. The toothings of the fastening ring and of the housing essentially form a structural interface which allows individual fastening of the housing in various rotational angular positions.

The rotational angle setting of the housing together with the sensor may be performed in a particularly simple manner when the first and second toothings are formed by ring toothings that have identical diameters and that are oriented coaxially with respect to one another. Due to the design of the toothings as ring toothings having identical diameters and a coaxial arrangement, the housing may be rotated into various rotational angular positions with respect to the fastening ring, and thus also with respect to the seat belt retractor, without the toothings becoming disengaged.

The housing may preferably be fixed between the seat belt retractor and the fastening ring, so that, via the fastening of the fastening ring to the seat belt retractor, the housing at the same time is also fastened to the seat belt retractor. The housing is essentially clamped between the seat belt retractor and the fastening ring.

It is further proposed that the first toothing of the housing is situated on the side of the housing facing away from the seat belt retractor, and the second toothing of the fastening ring is situated on the side of the fastening ring facing the seat belt retractor. The housing may thus be installed in the predetermined rotational angular position in a simplified manner, in that in a first step it is attached to the seat belt retractor in the predetermined rotational angular position. The fastening ring is subsequently mounted in a second step, as the result of which, due to the proposed arrangement, the two toothings automatically engage and fix the housing in the predetermined rotational angular position. The housing is fixed in the set rotational angle by the meshing of the toothings, and at the same time is fastened to the seat belt retractor by the fixing of the fastening ring on the seat belt retractor.

The first toothing is preferably situated on a radially outer edge of the housing, so that for installation, the fastening ring is guided over the housing and may be brought into engagement with the radially outwardly protruding toothing of the housing.

Moreover, the first and/or the second toothing may preferably be formed by obliquely oriented toothing, wherein the tooth flanks are oriented radial inwardly or outwardly and also in the axial direction of the belt winding shaft. Due to the proposed design of the toothings, they may additionally center the housing relative to the fastening ring, wherein the housing, in a preferred coaxial arrangement of the two toothings with respect to the rotational axis of the belt winding shaft, is also centered relative to the rotational axis of the belt winding shaft.

Alternatively, the first and/or the second toothing may each be formed by ring cylindrical toothing having tooth flanks oriented in parallel to the installation direction. The fastening ring may thus be at least slightly moved with respect to the housing in the installation direction without the tooth flanks disengaging from the toothings.

The tooth flanks may preferably be oriented in parallel to the axial direction of the belt winding shaft, so that the housing together with the sensor may be pushed on in the axial direction of the belt winding shaft. This approach is advantageous in particular due to the fact that the sensor has a lever arm that engages with a radially outwardly toothed control disk in order to trigger the blocking device. In order to fulfill its function, below a predetermined vehicle deceleration the lever arm must be oriented in a defined position with respect to the toothing of the control disk, from which it pivots for engagement with the toothing of the control disk when the predetermined vehicle deceleration is exceeded. Due to the proposed pushing-on direction of the housing together with the sensor mounted therein, this lever arm may be positioned in the defined position with respect to the belt winding shaft and the control disk mounted thereon in a particularly simple manner.

It is further proposed that the housing is connected to the fastening ring via a detent connection having preferably radially outwardly protruding detent sections. Detent connections are in principle very economical to manufacture and install, since they may establish the connection solely due to the design without additional aids, and may also be installed without tools. The detent connection is preferably formed by one or more radially outwardly protruding detent sections which establish the connection by a radial, form-fit overlap of the housing and the fastening ring. Such a connection is advantageous in particular due to the fact that an axial connection of the housing and of the fastening ring in parallel to the axial direction of the belt winding shaft is thus established, while the fixing of the two parts in the circumferential direction is implemented by the toothings. In the ideal case, the detent connection protects the housing alone from being pulled off in the withdrawal direction, without subjecting the engaged tooth flanks of the toothings to stress. It is particularly important that the housing is preferably not subjected to stress in the radial direction, so that the sensor mounted therein is not radially displaced from its defined position, which would or could result in a change in the response threshold of the blocking device.

The detent sections and the toothings may preferably be situated on the same side of the housing or of the fastening ring, thus further optimizing the required installation space, in that the detent sections protrude in the same direction as the toothing. For this purpose, the detent sections and the toothing may, for example, protrude radially inwardly from the fastening ring, so that the required installation space toward the radial outer side is not increased.

The detent sections may preferably be dimensioned in such a way that they radially overlap with the toothing situated on the respective other part. The detent sections may, for example, be situated on the fastening ring and may protrude so far radially inwardly that they radially overlap the toothing of the housing, and when the housing is inserted are thus elastically displaced outwardly until the housing has passed the detent sections with the toothing, and the detent sections spring back behind the toothing. As a result of the proposed approach, the toothing may be additionally utilized for locking the housing.

In addition, the toothings may preferably have sections that are free of toothing, and that are situated in overlap with the detent sections in the axial direction. The toothing is used for fixing the housing in a defined angular orientation with respect to the fastening ring and the frame of the seat belt retractor. For this purpose, it is sufficient for the toothing to have an interrupted design and to extend only between the detent sections. No toothing is provided in overlap with the detent sections in the axial direction, as the result of which the manufacture of the particular part having the detent sections and the toothing situated thereon may be simplified.

Furthermore, the housing may have a receptacle in which the support part together with the sensor mass is accommodatable in only one orientation. The receptacle is used to securely hold the sensor in the only one orientation. In addition, the sensor is thus necessarily positioned in the housing in a certain orientation and arrangement in a fixed positional relationship with respect to the housing, so that the sensor, due to the orientation of the housing and the rotational angle setting of the housing with respect to the control disk, may be positioned with high positional accuracy with respect to the control disk and in space.

Due to the proposed refinement, the installation may be further simplified in particular in an automated installation step, since the sensor is thus installed in a single possible orientation in the housing that is specified by the design and orientation of the receptacle. The receptacle may in particular be designed in such a way that the support part together with the sensor mass mounted therein is preferably surrounded on all sides, except for the side facing the control disk. In addition, acoustic decoupling to avoid transmission of structure-borne sound, or acoustic insulation via encapsulation configured specifically for this purpose, may be provided. It is only important that the sensor mass is deflected according to its intended function by inertial control when the predefined limit value of the vehicle deceleration is exceeded, and thus, the locking lever, which for actuating the blocking system engages with the control disk and stops it with respect to the belt shaft, is deflected.

It is further proposed that the support part has a bearing part on which the bearing surface is provided, wherein the bearing part may be oriented relative to the support part in various rotational angular positions about a pivot axis oriented transversely with respect to the rotational axis of the belt winding shaft. As a result of the proposed approach, to compensate for an inclined position of the seat belt retractor the sensor may additionally be oriented about a pivot axis aligned perpendicularly with respect to the rotational axis of the belt winding shaft.

BEST DESCRIPTION OF THE DRAWINGS

The invention is explained below based on preferred embodiments, with reference to the appended figures, which show the following.

DETAILED DESCRIPTION

Figure 1:
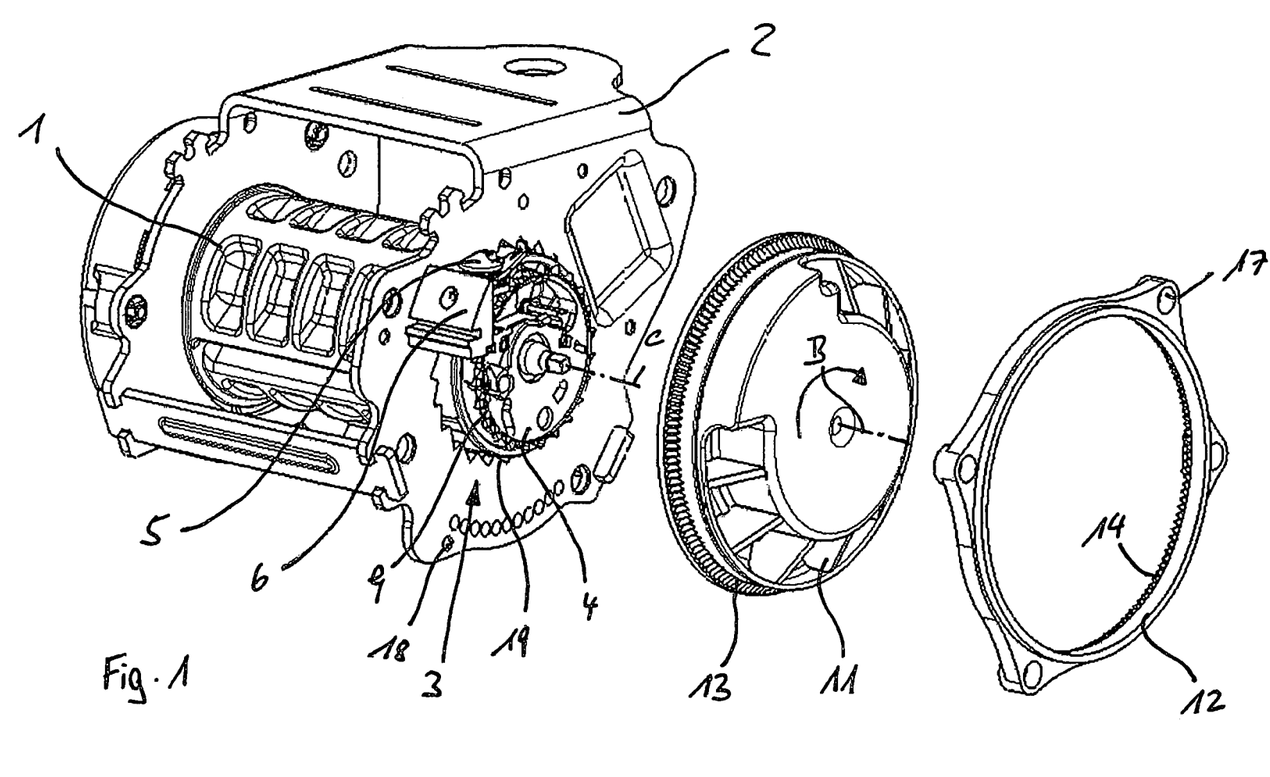
FIG. 1 shows a self-locking seat belt retractor together with a housing that is fastenable in various rotational angular positions, and a fastening ring.

FIG. 1 shows a self-locking seat belt retractor according to the invention having a frame 2 that is fastenable to the vehicle and a belt winding shaft 1 that is rotatably supported in the frame 2. A seat belt, not illustrated, which is used to restrain an occupant in a vehicle may be wound onto the belt winding shaft 1. The belt winding shaft 1 is pretensioned in the winding direction by a torsion spring, not illustrated, so that the seat belt in the buckled state rests against the occupant with a preferably small amount of slack, and when unbuckled, is securely wound into the parked position.

In addition, the seat belt retractor has a blocking system 3 with a control disk 4 and a blocking pawl, not discernible, which upon activation moves into blocking toothing 19 of the frame and thus blocks the belt winding shaft 1 against further pulling out of the seat belt. The blocking system 3 also includes a control disk 4, rotatably supported on the belt winding shaft 1, which is pretensioned with respect to the belt winding shaft 1 in the unwinding direction via a spring. A control contour with which the blocking pawl, not illustrated, engages via a journal is provided on the control disk 4. For the case that the control disk 4 is stopped with respect to the belt winding shaft 1 during the pulling-out motion of the seat belt, the control disk 4 via the control contour forces an actuating movement of the blocking pawl into the blocking toothing 19, as a result of which the belt winding shaft 1 is blocked in the pulling-out direction of the seat belt.

Figure 3:
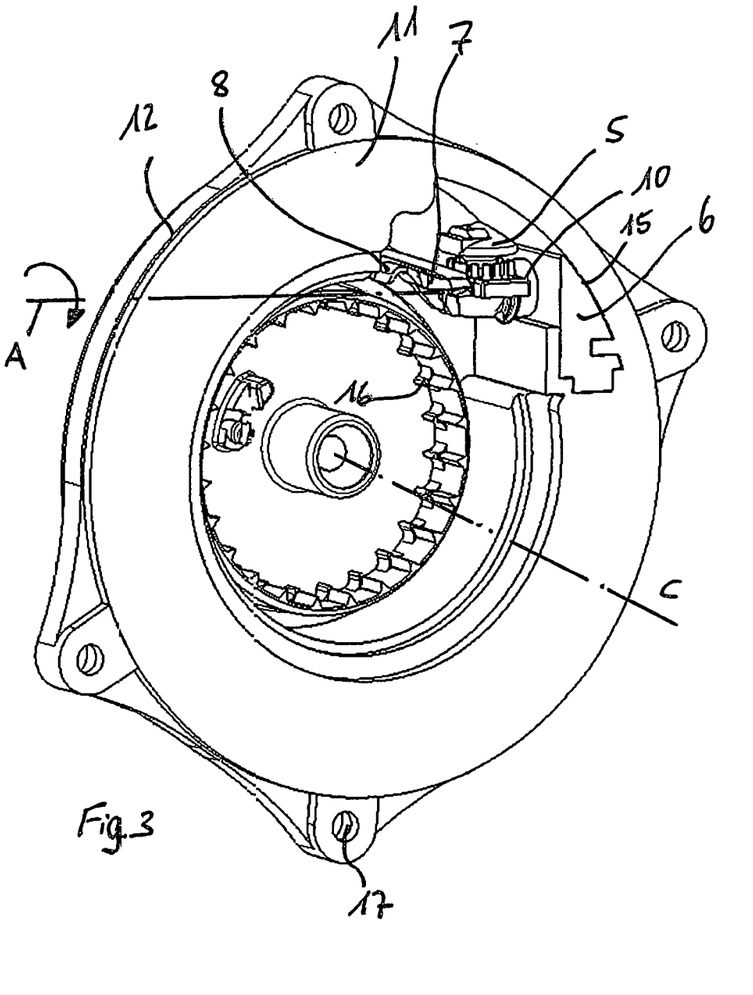
FIG. 3 shows the housing together with the fastening ring with a view of the interior.

Furthermore, the blocking system 3 includes a sensor mass 5, designed here as an upright mushroom-shaped mass, and a support part 6. The support part 6 has a borehole that is oriented and shaped in such a way that a bearing part 10, discernible in FIG. 3, may be rotated therein with respect to the support part 6 about a rotational axis A. The borehole is oriented in such a way that the rotational axis A of the displaceability of the bearing part 10 is situated transversely with respect to the rotational axis C of the belt winding shaft 1. The bearing part 10, after the rotational angle about the rotational axis A is set, forms a fixed unit with the support part 6, and has a bearing surface, not discernible, on which the sensor mass 5 rests. In addition, the blocking system 3 has a locking lever 7 against which the sensor mass 5 rests. When the sensor mass 5 is pivoted from a neutral position into a trigger position due to a vehicle deceleration that exceeds the predefined limit value, the locking lever 7 is deflected until it engages, with its engagement tip 8, into the toothing 9 of the control disk 4, as a result of which the control disk 4 is stopped with respect to the belt winding shaft 1 in order to trigger the blocking. Also situated on the control disk 4 is an inertial mass, not illustrated in greater detail, which is spring-loaded with respect to the control disk 4 in the winding direction, and which, when a predetermined limit value of the seat belt pulling-out acceleration is exceeded, is deflected with respect to the control disk 4 and into WS toothing 16 of the housing 11, and thus stops the control disk 4 with respect to the belt winding shaft 1.

In order for the sensor together with the sensor mass 5 and the support part 6 to block the belt winding shaft 1 as intended when the predefined limit value of the vehicle deceleration is exceeded, it is important that the sensor mass 5 in the neutral position is standing in a predetermined upright position in which the locking lever 7 is not engaged with the toothing 9 of the control disk 4, and the control disk 4 together with the belt winding shaft 1 can freely rotate. In order for the same seat belt retractor to be used in different installation orientations in a preferably large number of vehicles, the support part 6 and the sensor mass 5 mounted therein must be individually aligned with the seat belt retractor in such a way that below the predefined vehicle deceleration, the sensor mass 5 in the particular installation position of the seat belt retractor is in the neutral position. For this purpose, in a first step the sensor mass 5 is oriented about a first rotational angle by rotating the bearing part 10 with respect to the support part 6 about the rotational axis A.

The seat belt retractor also includes a housing 11 which surrounds the control disk 4 on all sides in the fastened position, and a fastening ring 12. The housing 11 has a receptacle 15, discernible in FIG. 3, that is shaped in such a way that the support part 6 therein can be arranged in only one orientation. For installation, the subassembly made up of the support part 6, the bearing part 10, and the sensor mass 5 is preassembled, and before or after the sensor mass 5 is inserted the bearing part 10 is fastened in the support part at the same predetermined rotational angle about the rotational axis A. The preassembled assembly is subsequently arranged in the receptacle 15 of the housing 11 in the one possible orientation. In a next step the housing 11 is arranged on the frame 2 of the seat belt retractor in a predetermined rotational angular position about the rotational axis B, discernible in FIG. 1, and by mounting the fastening ring 12 is fastened in the set rotational angle about the rotational axis B.

The housing 11 on its radially outer edge has first annular toothing 13 situated on the side facing away from the frame 2. The fastening ring 12 has second toothing 14 situated on the side facing the frame 2, i.e., opposite from the first toothing 13. The fastening ring 12 has four fastening attachments 17 that are situated on the circumference of the fastening ring 12 in such a way that the fastening ring 12 can be fastened to the frame 2 in only one orientation in corresponding fastening openings 18 via corresponding fastening rivets or screws. The fastening ring 12 is then mounted in such a way that the two toothings 13 and 14 engage with one another, and the radial flange of the housing 11, on which the first toothing 13 is situated, is clamped between the frame 2 of the seat belt retractor and the fastening ring 12.

Figure 2:
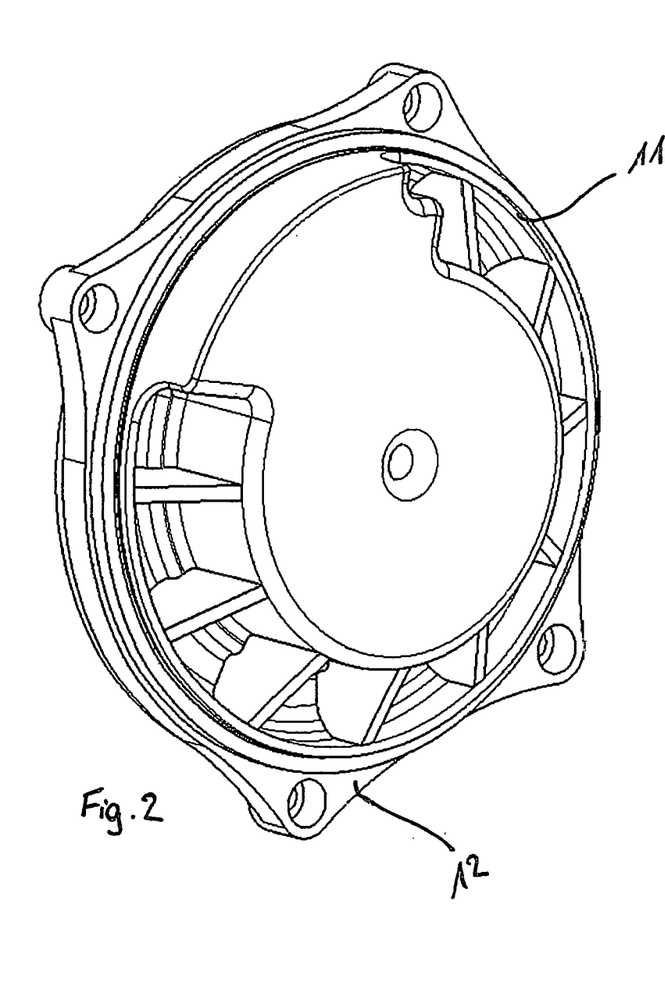
FIG. 2 shows the housing together with the fastening ring with a view of the exterior.

As is apparent in the illustration in FIG. 2, the housing 11 may be grasped and oriented without exposing the sensor to mechanical stress. The sensor is inserted into the housing 11 beforehand, and during the fastening operation to the seat belt retractor the sensor is protected by the housing 11. The orientation in the predetermined rotational angular position may then be provided in rotational angle increments that are specified by the tooth intervals of the toothings 13 and 14. The finer the toothings 13 and 14, the finer the adjustability of the rotational angle about the rotational axis B. The toothings 13 and 14 have an annular design, and are situated in such a way that in the fastened position on the seat belt retractor they are oriented concentrically with respect to the rotational axis C of the belt winding shaft 1.

Figure 4:
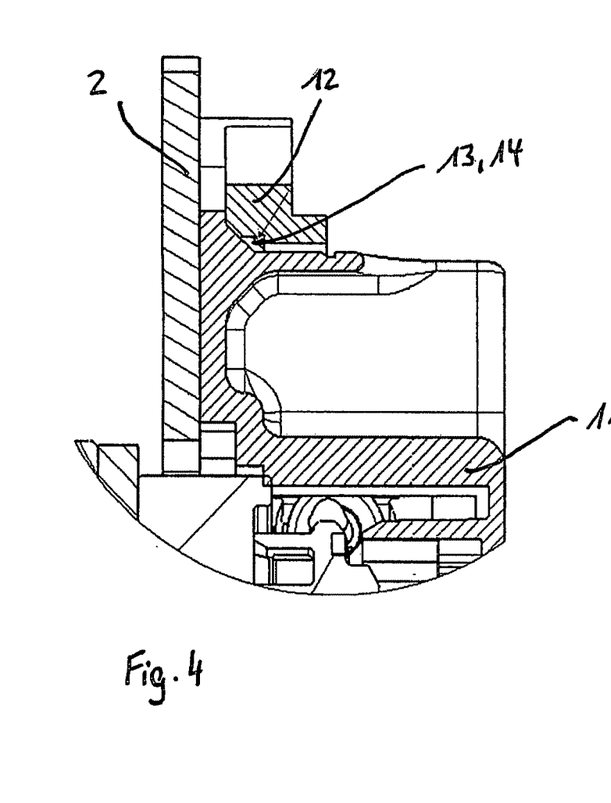
FIG. 4 shows a sectional illustration of a section plane of the seat belt retractor oriented in parallel to the rotational axis, together with a housing and a fastening ring with obliquely oriented toothings.

In the exemplary embodiment in FIG. 4, the two toothings 13 and 14 are oriented obliquely with respect to the rotational axis C of the belt winding shaft 1, with the diameter of the toothings 13 and 14 increasing in the direction of the frame 2. The inclination angles of the toothings 13 and 14 are identical, so that the teeth of the toothings 13 and 14 lie as flatly as possible against one another. Due to the oblique orientation of the toothings 13 and 14, the housing 11 is additionally centered relative to the fastening ring 12. Since the second toothing 14 of the fastening ring 12 has an annular design, and the fastening ring 12 is centered relative to the center of the bearing opening by the positioning of the fastening openings 18 in the frame 2 and the fastening flanges 17 on the fastening ring 12, the housing 11 is thus also centered relative to the rotational axis C of the belt winding shaft 1 supported therein. The sensor and in particular the engagement tip 8 of the locking lever 7 are thus positioned with very high positional accuracy with respect to the control disk 4 and its toothing 9.

Figure 5:
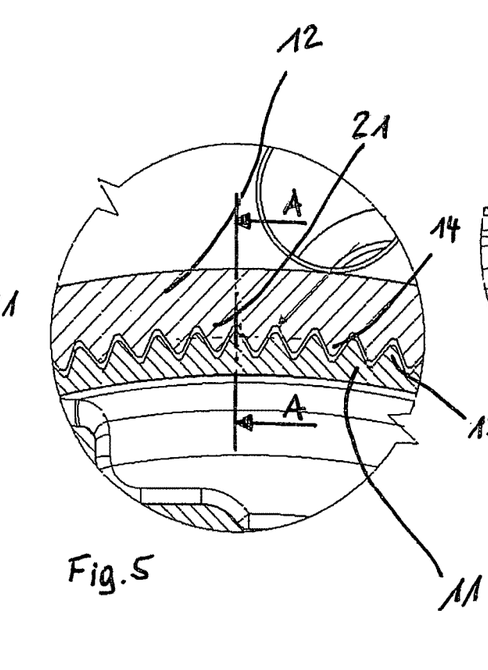
FIG. 5 shows a sectional illustration of a section plane of the seat belt retractor oriented perpendicularly with respect to the rotational axis, together with a housing and a fastening ring with toothings in straight alignment.
Figure 6:
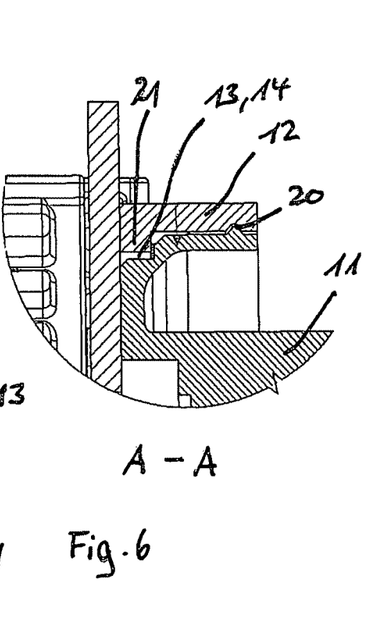
FIG. 6 shows a sectional illustration of the seat belt retractor in FIG. 5 in the section direction A-A.

One alternative embodiment of the invention is shown in FIGS. 5 and 6, in which the fastening ring 12 is first fastened to the frame 2. The fastening ring 12 has an annular recess 21, having a cylindrical inner diameter, on which the second toothing 14 is situated. In addition, the first toothing 13 on the housing 11 is situated here on an annular outer surface having an outer diameter that is constant in the axial direction. After the fastening ring 12 is fastened to the frame 2, the housing 11 is inserted with the first toothing 13 into the second toothing 14 of the fastening ring 12, and is thus also connected to the frame 2 of the seat belt retractor via a detent connection 20 to the fastening ring 12. Due to the detent connection 20, a radial, form-fit overlap is created between the housing 11 and the fastening ring 12 which protects the housing 11 from being pulled off. The two toothings 13, 14 on the fastening ring 12 and on the housing 11 are each formed here as straight toothings on a cylindrical inner surface or outer surface. The tooth flanks of the toothings 13, 14 are oriented in parallel to the axial direction of the belt winding shaft 1, so that the housing 11 may be inserted linearly into the fastening ring 12 in the axial direction of the belt winding shaft 1.

Figure 7:
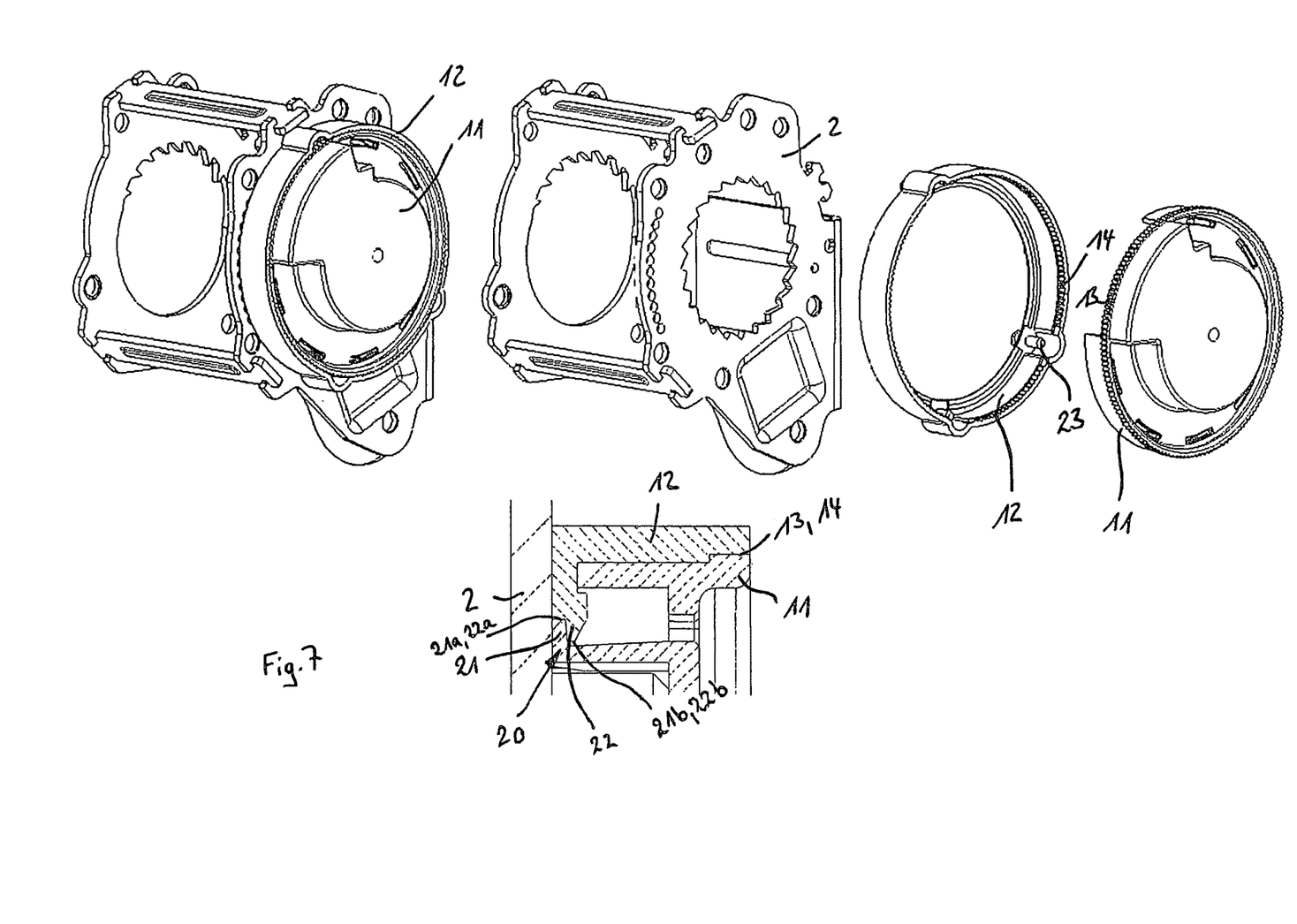
FIG. 7 shows a self-locking seat belt retractor together with a housing for a sensor, and a fastening ring, which are connected to one another via a detent connection.

FIG. 7 shows another alternative embodiment of the invention in which the housing 11 and the fastening ring 12 likewise have straight toothings 13 and 14 that are oriented in the axial direction of the belt winding shaft 1, not illustrated, and that are each situated on cylindrical circumferential surfaces of the housing 11 and of the fastening ring 12. The fastening ring 12 here is fastened to the frame 2 of the seat belt retractor via three pins or rivets 23. The toothing 14 on the fastening ring 12 has straight tooth flanks, which in the fastened position are oriented in parallel to the axial direction of the belt winding shaft 1. The housing 11 together with the sensor situated therein is subsequently mounted, and the two toothings 13 and 14 come into engagement. Since the toothing 13 likewise has straight tooth flanks that are situated on a cylindrical circumferential surface, the housing 11 may be inserted into the fastening ring 12 in the axial direction of the belt winding shaft 1. In addition, a detent connection 20 is provided which is formed by two detent sections 21 and 22 that radially overlap in a form-fit manner. The detent sections 21 and 22 themselves have such a flexible design that when the housing 11 is inserted, they elastically deform radially inwardly and outwardly until they ultimately engage one behind the other in the end position and protect the housing 11 from being unintentionally pulled off. The detent connection 20 here is formed solely by an axial overlap, the detent sections 21 and 22 being dimensioned in such a way that they rest against one another in the radial direction on first surfaces 21a, 22a of the detent sections 21, 22, while a gap is present between two second surfaces 22a, 22b, so that the housing 11 is fixed in the predefined position with respect to the fastening ring 12, the belt winding shaft 1, and in particular the control disk 4, not illustrated. The first surfaces 21a, 22a should thus be produced with particularly high positional accuracy, since they at least have a decisive influence on the position of the housing 11.

Figure 8:
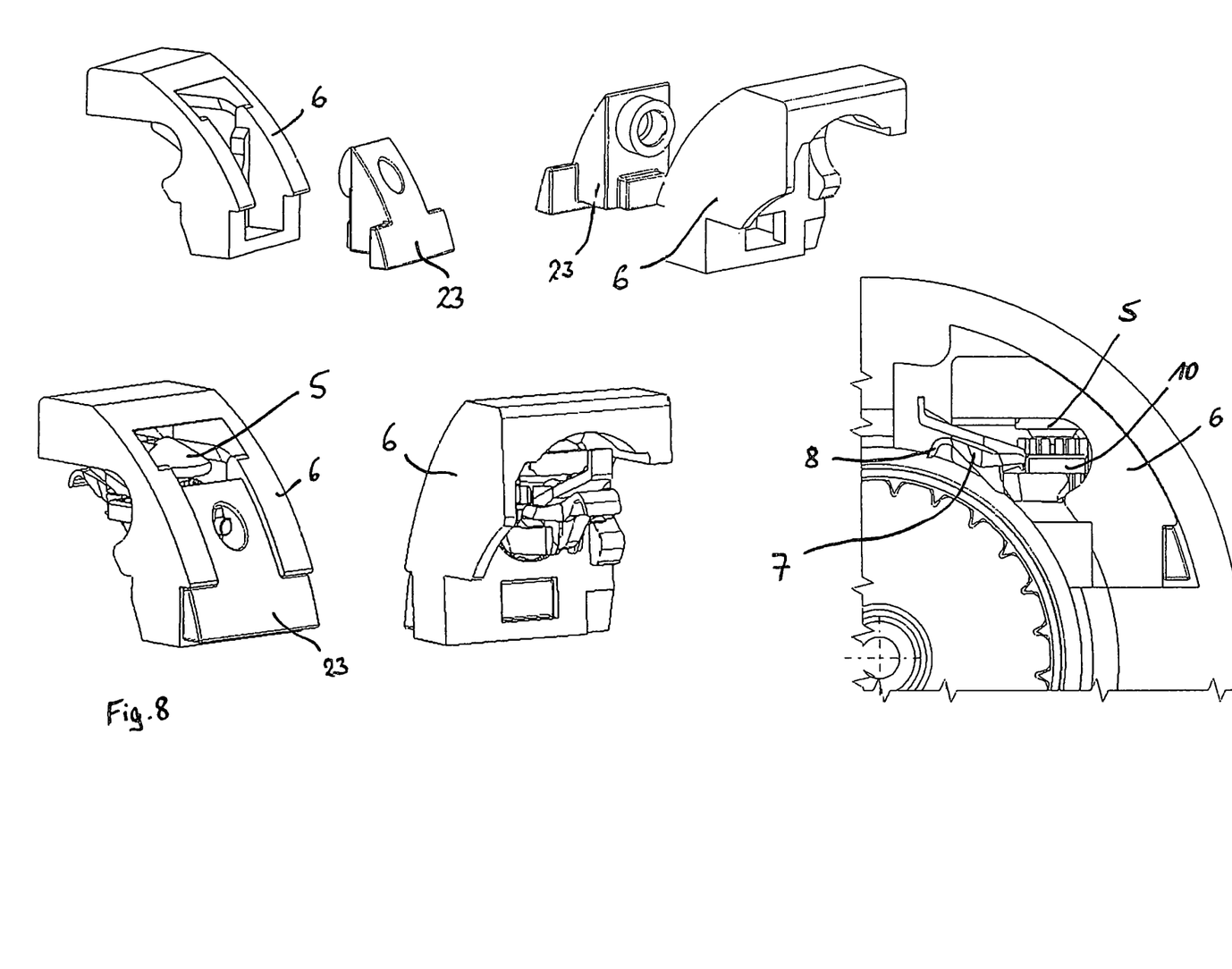
FIG. 8 shows a detail of a housing together with a sensor having an insulation element and an acoustically insulating inertial mass.
Figures 9, 10, 11, 12, 13:
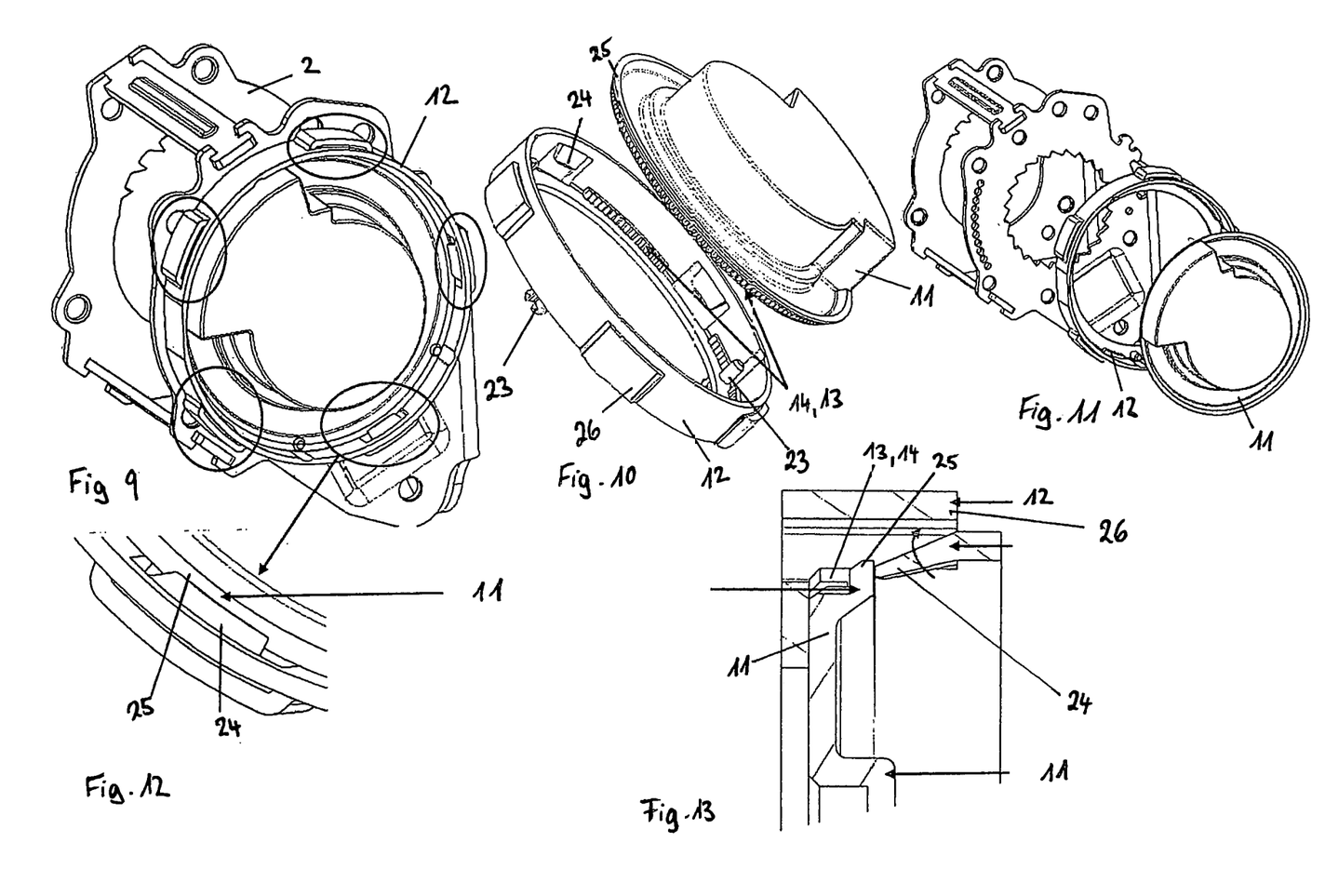
FIGS. 9-13 show a frame together with a fastening ring and a housing having multiple detent sections for fastening the housing.

FIG. 8 shows the sensor in enlarged views. The sensor has a support part 6 and a mushroom-shaped upright sensor mass 5, and an acoustically insulating inertial mass 23 is additionally provided between the sensor mass 5 and the support part 6. The support part 6 encapsulates the sensor, so that the noise that is generated is additionally insulated. The support part 6 may thus also be referred to as an insulation element.

FIGS. 9 through 13 show one alternative embodiment of the invention in which the fastening ring 12 is clipped to the frame 2 via multiple pins or rivets 23. The fastening ring 12 on its radially inner side has toothing 14 and five detent sections 24, spaced equidistantly in the circumferential direction, in the form of spring tongues that protrude radially inwardly in the direction of the frame 2 in the fastened position of the fastening ring 12. The toothing 14 on the fastening ring 12 has five sections that are free of toothing, and that are situated in such a way that they axially overlap the detent sections 24. The toothing 14 with the sections tree of toothing, and the detent sections 24 are both situated on the fastening ring 12 on the same side, namely, the radially inner side, and radially protrude from the fastening ring 12 toward the inner side, so that the outer dimensions of the fastening ring 12 are not increased by the toothing 14 and the detent sections 24. In addition, the detent sections 24 are situated in such a way that they overlap the sections free of toothing, so that the detent sections 24 and the toothed sections of the toothing 14 alternate in the axial projection.

The detent sections 24 are designed as radially inwardly protruding spring tongues that protrude in the direction of the rivets or pins 23, i.e., in the direction of the frame 2 in the fastened position. The housing 11 also has a radially protruding annular collar 25 that has a larger outer diameter than the diameter of the ring that is spanned by the end-face sides of the detent sections 24. As is apparent in FIG. 13, the detent sections 24 are thus elastically displaced radially outwardly when the housing 11 is introduced. After passing the collar 25, the detent sections 24 spring back, and the housing 11 together with the collar 25 and the adjoining toothing 13 is locked between the end-face sides of the detent sections 24 and the base of the fastening ring 12. The detent sections 24 are covered on the radially outer side by a wall section 26 of the fastening ring 12, and are thus protected from external mechanical stress.

The invention claimed is:

1. A self-locking seat belt retractor comprising:
   a rotatable seat belt winding shaft; and
   a blocking system for stopping rotation of the seat belt winding shaft in response to an event of triggering, the blocking system including a control disk mounted for rotation with the seat belt winding shaft, a sensor mass, and a locking lever with an engagement tip, the locking lever movable by the sensor mass into a trigger position in which the engagement tip is in engagement with a toothing of the control disk to activate the blocking system and stop rotation of the seat belt winding shaft,
   wherein the sensor mass is situated in a support part, sensor mass is movable in response to vehicle acceleration by inertial control from a neutral position into the trigger position,
   wherein the support part together with the sensor mass situated therein is situated in a housing that includes the control disk,
   wherein the housing with the support part and the sensor mass situated therein is fixable on the seat belt retractor in various rotational angle positions with respect to the control disk and
   wherein the housing has first toothing, and a fastening ring fastened to the seal belt retractor is provided with second toothing, and the housing, via the engagement of the first toothing with the second toothing of the fastening ring, is fastenable to the seat belt retractor in the particular rotational angular position with respect to the control disk.

2. The self-locking seat belt retractor according to claim 1, wherein the first and the second toothings are formed by ring toothings that have identical diameters and that are oriented coaxially with respect to one another.

3. The self-locking seat belt retractor according to claim 1, wherein the housing is fixed between the seat belt retractor and the fastening ring.

4. The self-locking seat belt retractor according to claim 1, wherein the first toothing of the housing is situated on the side of the housing facing away from the seat belt retractor, and the second toothing of the fastening ring is situated on the side of the fastening ring facing the seat belt retractor.

5. The self-locking seat belt retractor according to claim 1, wherein the first toothing is situated on a radial outer edge of the housing.

6. The self-locking seat belt retractor according to claim 1, wherein at least one of the first and the second toothing is formed by obliquely oriented toothing, wherein the tooth flanks are oriented radially inwardly or outwardly and also in the axial direction of the belt winding shaft.

7. The self-locking seat belt retractor according to claim 1, wherein at least one of the first and the second toothing are formed by ring cylindrical toothing having tooth flanks oriented in parallel to the installation direction.

8. The self-locking seat belt retractor according to claim 7, wherein the tooth flanks are oriented in parallel to the axial direction of the belt winding shaft.

9. The self-locking seat belt retractor according to claim 7, wherein the housing is connected to the fastening ring via a detent connection having detent sections selected from a group consisting of radially outwardly detent sections and radially inwardly protruding detent sections.

10. The self-locking seat belt retractor according to claim 9, wherein the detent sections and the toothings are situated on a same side of the housing or of the fastening ring.

11. The self-locking seat belt retractor according to claim 10, wherein the detent sections and the toothing situated on the respective other part radially overlap.

12. The self-locking seat belt retractor according to claim 10, wherein the toothings have sections that are free of toothing, and that are situated in overlap with the detent sections in the axial direction.

13. The self-locking seat belt retractor according to claim 1, wherein the housing has a receptacle in which the support part together with the sensor mass is accommodatable in only one orientation.

14. The self-locking seat belt retractor according to claim 1, wherein the support part has a bearing part on which the bearing surface is provided, and
   wherein the bearing part is oriented relative to the support part in various rotational angular positions about a rotational axis oriented transversely with respect to the rotational axis of the belt winding shaft.

* * * * *